United States Patent [19]
Quintern

[11] Patent Number: 5,696,381
[45] Date of Patent: Dec. 9, 1997

[54] RADIATION DOSIMETER FOR THE DETECTION AND/OR DOSIMETRY OF RADIATION, PARTICULARLY UV RADIATION

[75] Inventor: Lothar Quintern, Bornheim, Germany

[73] Assignee: Deutsche Forschungsanstalt fur Luft- und Raumfahrt e.V., Bonn, Germany

[21] Appl. No.: 630,139

[22] Filed: Apr. 10, 1996

[30] Foreign Application Priority Data

Apr. 13, 1995 [DE] Germany .................. 195 14 044.3

[51] Int. Cl.$^6$ ............................................. G01J 5/08
[52] U.S. Cl. .................... 250/472.1; 250/474.1
[58] Field of Search .................. 250/372, 472.1, 250/474.1

[56] References Cited

U.S. PATENT DOCUMENTS

| | | |
|---|---|---|
| 3,838,282 | 9/1974 | Harris ........................ 250/372 |
| 4,535,244 | 8/1985 | Burnham ..................... 250/372 |
| 5,117,116 | 5/1992 | Bannard et al. ........... 250/472.1 X |
| 5,371,004 | 12/1994 | Quintern . |

FOREIGN PATENT DOCUMENTS

| | | |
|---|---|---|
| 8711714 | 1/1988 | Germany . |
| 8903470 | 8/1989 | Germany . |
| 4039002 | 6/1992 | Germany . |

*Primary Examiner*—Edward J. Glick
*Attorney, Agent, or Firm*—Loeb & Loeb LLP

[57] ABSTRACT

The radiation dosimeter for the detection/and or dosimetry of radiation, particularly UV radiation, is provided with a housing comprising an opening. A sensor device sensitive to the radiation of interest is arranged below the diffuser cover layer (10). The diffuser cover layer (10) covers an opening and is transmissive at least to the radiation of interest.

10 Claims, 1 Drawing Sheet

RADIATION DOSIMETER FOR THE DETECTION AND/OR DOSIMETRY OF RADIATION, PARTICULARLY UV RADIATION

BACKGROUND OF THE INVENTION

The present invention relates to a passive radiation dosimeter for the detection and/or dosimetry of radiation, particularly UV radiation.

For detecting the intensity of irradiation to which an object or person is exposed, electronically high-grade apparatus are known which are primarily used for scientific purposes. The radiation dosimetry, however, is also suitable and desirable for a plurality of everyday applications, for example in commercial tan studios, for detecting the radiation dose a person is exposed to, or for detecting the dose of natural radiation a person being outdoors is exposed to. In the latter case, it may be a medically or therapeutically advisable measure or only a protective measure.

Apart from the already mentioned electronically high-quality apparatus for the radiation dosimetry, devices for determining the radiation intensity in the ultraviolet radiation range with a rather simple structure are known from German utility models DE 87 11 714 U1 and DE 89 03 470 U1.

SUMMARY OF THE INVENTION

It is the object of the present invention to provide a radiation dosimeter for detecting radiation, particularly UV radiation, by means of which the radiation dose is reliably detectable.

This object is solved, according to the invention, by means of a passive radiation dosimeter being provided with a housing comprising an opening, a diffuser cover layer covering the opening and being transmissive at least to the radiation of interest, and a sensor device arranged below the diffuser cover layer and being sensitive to the radiation of interest.

With the radiation dosimeter of the invention, the incident radiation first reaches the diffuser cover layer acting as a diffuser and influencing the sensor sensitivity as a function of the incident angle of the radiation. The diffuser cover layer is transmissive to the radiation of interest and should be as thin as possible for reasons of space-saving accommodation within the housing. Further, the diffuser cover layer serves as weather protection and protection against mechanical influences. Suitably, the diffuser cover layer has a hydrophobic and robust configuration.

Depending on the desired dependence of the sensor response on the incident angle of the radiation (cosine dependence or angular-independent), plane or arcuate covers can be used. Particularly, for example, a plane-parallel plate of polytetrafluoroethylene (PTFE) material having a thickness of from 0.25 to 5 mm, particularly of 1.0 mm, can be used as a cover. Similar UV transmissive materials are also possible.

An advantageous development of the invention provides that the sensor device is not exposed to the radiation of interest over its entire sensitive area, but comprises non-irradiated dark areas. Depending on the sensor device type, these dark areas are required for purposes of calibration, which means, to be able to detect the radiation dose from a comparison of the areas exposed to radiation with the calibration zones.

Preferably, a diaphragm is located between the opening of the housing and the sensor device, and suitably below the diffuser cover layer. The diaphragm comprises one or more orifices and at least one surface area opaque to the radiation of interest. The calibration zone of the sensor device is arranged below this area, if need be. Advantageously, the diaphragm is made of an aluminum foil, i.e., of an opaque thin material.

To be able to increase the dynamic range of the sensor device, a further advantageous embodiment of the invention provides that neutral filters with different transmission properties are arranged between the opening of the housing and the sensor device. Preferably, these neutral filters are arranged in the diaphragm orifices. In this case, it is useful to provide that at least one diaphragm orifice is not covered by a neutral filter. The neutral filters have the task to dampen the incident radiation to different degrees and largely independent of its wavelength. The neutral filters should be as thin as possible so that they can be accommodated in the housing in a space-saving manner.

Suitably, single- or multilayered metallic nets of stainless steel wire are employed as neutral filters. These metallic nets are particularly rather thin and fine-meshed. Preferably, the metallic nets have a mesh size of from 5 to 100 μm, particularly 25 μm, and a wire thickness of from 5 to 100 μm, particularly 25 μm as well. If several metallic nets are superposed to thus preset the radiation damping, the mesh size and wire thickness of the metallic nets employed should be different to avoid too great damping effects due to mesh openings of the one metallic net being overlaid by the wires of the other metallic net. As an alternative, an additional diffuser layer can be arranged between the metallic nets to avoid this problem.

In a dosimeter with a diaphragm comprising three diaphragm orifices, a diaphragm orifice is spared for a one-hundred-percent transmission, while a single-layered metallic net is arranged in alignment with the second diaphragm orifice. In projection of the third diaphragm orifice, two metallic nets are then arranged to achieve for this case the highest possible degree of radiation damping for the subjacent area of the sensor device. With a diaphragm with one orifice, this one can be partially covered by single- or multilayered metallic nets and further has at least one bare area.

Advantageously, a sensor and a filter for selecting the radiation of interest, e.g., the UV-A, UV-B or UV-C radiation, are employed as a sensor device. This means that the filter has the task to filter out certain regions of the spectrum of the radiation incident on the dosimeter.

When using a diaphragm, this filter is preferably arranged such that only a part of the at least one diaphragm orifice is covered by the filter. This has the advantage that both the radiation filtered by this filter and radiation unfiltered in this respect impinge on one and the same sensor.

Another preferred embodiment of the invention provides that a biosensor is employed as a sensor, which comprises a hydrophilic substrate with a coating of immobilized microorganisms. Selected areas of the coating of immobilized microorganisms are exposed to the radiation to be detected. For detecting the radiation dose, the biosynthesis of the immobilized microorganisms is initiated after completion of the radiation exposure by incubating the substrate and the immobilized microorganisms in a suitable sterile growth medium. In doing so, the development of biosynthetic products, the cell inactivation of the microorganisms in particular, is densitometrically determined after a selective staining. The biosensor mentioned above and the method for biologically detecting radiation by means of immobilized microorganisms is described in detail in U.S. Pat. No. 5,317,004. The contents thereof is hereby incorporated by reference.

For handling the apparatus, it is advantageous when the housing comprises a closable aperture which is particularly arranged on the rear of the housing facing away from the opening. Via this aperture, the sensor device can be taken out of the housing and a new sensor device can be inserted thereinto.

The radiation dosimeter of the invention stands out due to its extreme simple construction, wherein it is achieved that the sensitivity of the sensor device is modified as a function of the incident angle of radiation due to the diffuser cover layer being that layer of the radiation dosimeter which is arranged first in the radiation path. The radiation dosimeter of the invention is particularly suitable as a person dosimeter and can conveniently be carried along by a person and be attached to clothing in particular. Incorporating the radiation dosimeter of the invention into earrings, tie-pins, brooches, sunglasses, head-gear (suncaps), watches, bracelets, necklace pendants and/or buttons is conceivable and contributes really decisively to the acceptance of the radiation dosimeter.

BRIEF DESCRIPTION OF THE DRAWINGS

The following is a detailed description of an embodiment of the invention with reference to the Figures, in which.

DETAILED DESCRIPTION OF A PREFERRED EMBODIMENT

Figure 2:
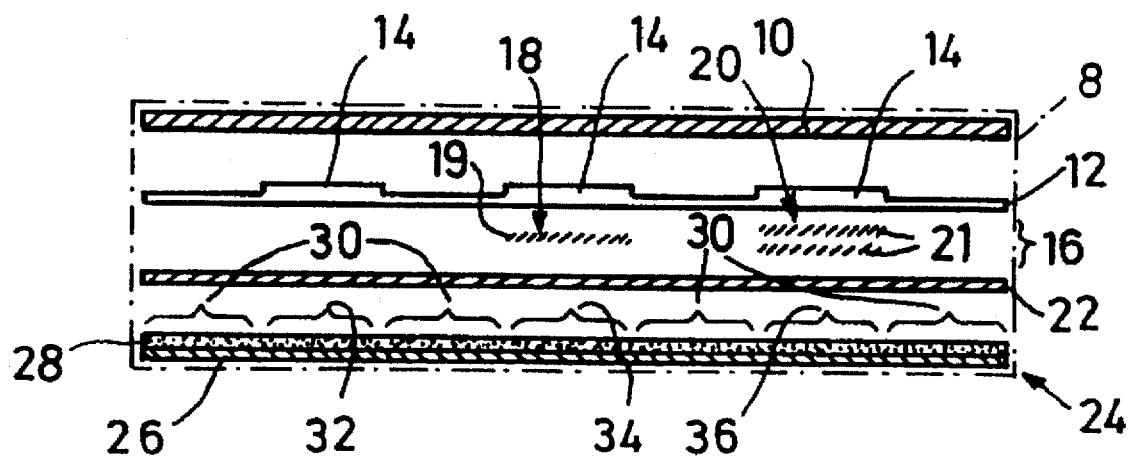
FIG. 2 is a cross-sectional view seen along line II—II of FIG. 1.
Figure 1:
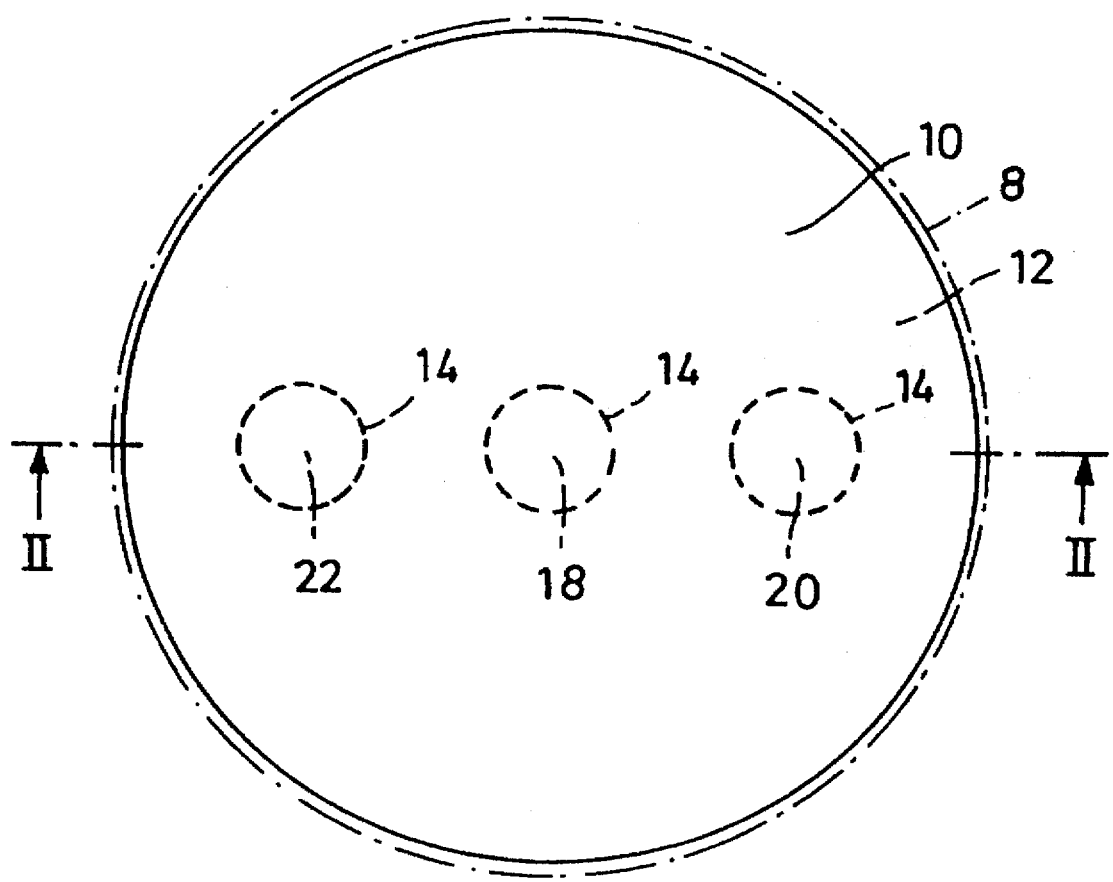
FIG. 1 is a plan view of the diffuser cover layer of a person dosimeter, with a diaphragm comprising three diaphragm orifices in all being arranged therebelow.

Hereinafter, the structure of the UV radiation dosimeter will be explained with reference to the highly schematized cross-sectional representation according to FIG. 2.

In a housing 8 (indicated in phantom lines in the Figures) of plastic, for example, an arrangement of superposed material layers or strata is provided. The uppermost layer facing the radiation is formed by a diffuser cover 10 made of polytetrafluoroethylene (PTFE material). This material is transmissive to UV radiation and serves to transfer the incident UV radiation cosine-dependently or angular-independently to the layers arranged below. A diaphragm 12 with three diaphragm orifices 14 is arranged below the diffuser cover 10. The diaphragm 12 consists of opaque material and is here configured as aluminum foil. The UV radiation reaches a filter system 16 arranged below the diaphragm 12 through the diaphragm orifices 14. This filter system 16 comprises neutral filters 18,20 as well as a UV filter 22. The neutral filters 18,20 arranged in alignment with two of the three diaphragm orifices below the diaphragm 12 and before the UV filter 22 have the task to dampen the UV radiation largely independent as to wavelength. The third diaphragm orifice is not "closed" by a neutral filter or the like located therebelow; the radiation penetrating through this orifice 14 rather impinges directly onto the UV filter 22.

The two neutral filters 18,20 have different transmission properties. The neutral filter 18 is a single-layered metallic net 19 made of stainless steel and having a mesh width of 25 μm and also a wire thickness of 25 μm. The neutral filter 20 is formed by superposition of two such metallic nets 21, so that its degree of transmission is reduced correspondingly.

Alternatively, it is possible to employ metallic filters of different mesh widths and wire thicknesses for the neutral filter 20 or to arrange a diffuser layer between both layers when using identical metallic nets.

The UV filter 22 arranged below serves to block partial ranges of the spectrum of the incident radiation.

Below the UV filter 22, there is a sensor device 24 comprising a hydrophilic substrate 26, particularly in the form of a plastic sheet, and immobilized microorganisms 28 coated on the substrate. Hence, the different portions of the coating of immobilized microorganisms 28 are exposed to the UV radiation of interest to different degrees. In the surface areas designated with 30, no radiation at all impinges onto the microorganism coating 28, since these areas are obscured or covered by the diaphragm 12. These areas form the calibration zone which is necessary to be able to detect the dose of radiation in the remaining regions from the changes in the microorganism coating 28. In the region of zone 32 aligned with the diaphragm orifice 14 not covered by a neutral filter or the like, maximum UV radiation impinges onto the microorganism coating 28. In zone 34, less UV radiation impinges onto the coating above which the single-layered metallic net of the neutral filter 18 is located. The radiation impinging onto the microorganism coating 28 in zone 36 is even more dampened; this radiation has to pass the neutral filter 20 consisting of two superposed metallic nets beforehand. The evaluation of the biosensor device 24 as well as its way of functioning is described in detail in U.S. Pat. No. 5,371,004. Reference to this document is expressly made.

The entire layer sequence according to FIG. 2 is surrounded by a plastic housing comprising an opening in the region of the diffuser cover 10. Apart from the optical physical function, the diffuser cover 10 also has a pure mechanical function as a protection against mechanical stresses and weather. The diffuser cover 10 is hydrophobic and is made of, e.g., plane-parallel PTFE material having a thickness of 1.0 mm. The entire housing has a water-proof configuration; should it be made of two parts, sealing is effected by means of an O-ring of elastic material, particularly rubber, which can be used as a squeeze sealing between the diffuser cover and between the sensor device 24 and the rear housing closure. The rear side of the housing is preferably provided with a closable aperture to be able to exchange the sensor device 24 without impairing the layer structure. Suitably, different sensor devices can be used in the housing.

What is claimed is:

1. A radiation dosimeter for the detection and dosimetry of ultraviolet (UV) radiation, comprising:

a housing comprising an opening, a diffuser cover layer covering the opening and being transmissive to the UV radiation, and a sensor device arranged below the diffuser cover layer and being sensitive to the UV radiation, wherein for increasing the dynamic range of the sensor device, at least one neutral filter partially covering the sensor device is arranged between the sensor device and the opening, for dampening the UV radiation impinging onto different areas of the sensor device to a different degree and neutral as to wavelength.

2. The radiation dosimeter according to claim 1, wherein the sensor device is arranged within the housing relative to the opening thereof in such a manner that it comprises dark areas not exposed to the UV radiation.

3. The radiation dosimeter according to claim 1, wherein a diaphragm having one or more orifices and a surface area opaque to the UV radiation is arranged between the opening of the housing and the sensor device.

4. The radiation dosimeter according to claim 1, wherein a plurality of neutral filters with different transmission properties are provided.

5. The radiation dosimeter according to claim 1, wherein each neutral filter is a single- or multilayered metallic net.

6. The radiation dosimeter according to claim 5, wherein a diffuser layer is arranged between successive layers of each multilayered metallic net.

7. The radiation dosimeter according to claim 5, wherein each multilayered metallic net comprises layers having different mesh widths and wire thicknesses.

8. The radiation dosimeter according to claim 1, wherein the sensor device comprises a sensor and a filter for the spectral modification of the UV radiation.

9. The radiation dosimeter according to claim 8, wherein the sensor comprises a hydrophilic substrate with a coating of immobilized microorganisms.

10. The radiation dosimeter according to claim 1, wherein the housing is transportable and is adapted to be attached to clothing.

* * * * *